July 31, 1951  H. W. DAVID ET AL  2,562,702
ARTICLE FORMING APPARATUS
Filed Dec. 30, 1946  3 Sheets-Sheet 1

INVENTORS
H. W. DAVID
M. L. SVIKHART
BY
ATTORNEY

July 31, 1951 H. W. DAVID ET AL 2,562,702
ARTICLE FORMING APPARATUS
Filed Dec. 30, 1946 3 Sheets-Sheet 2
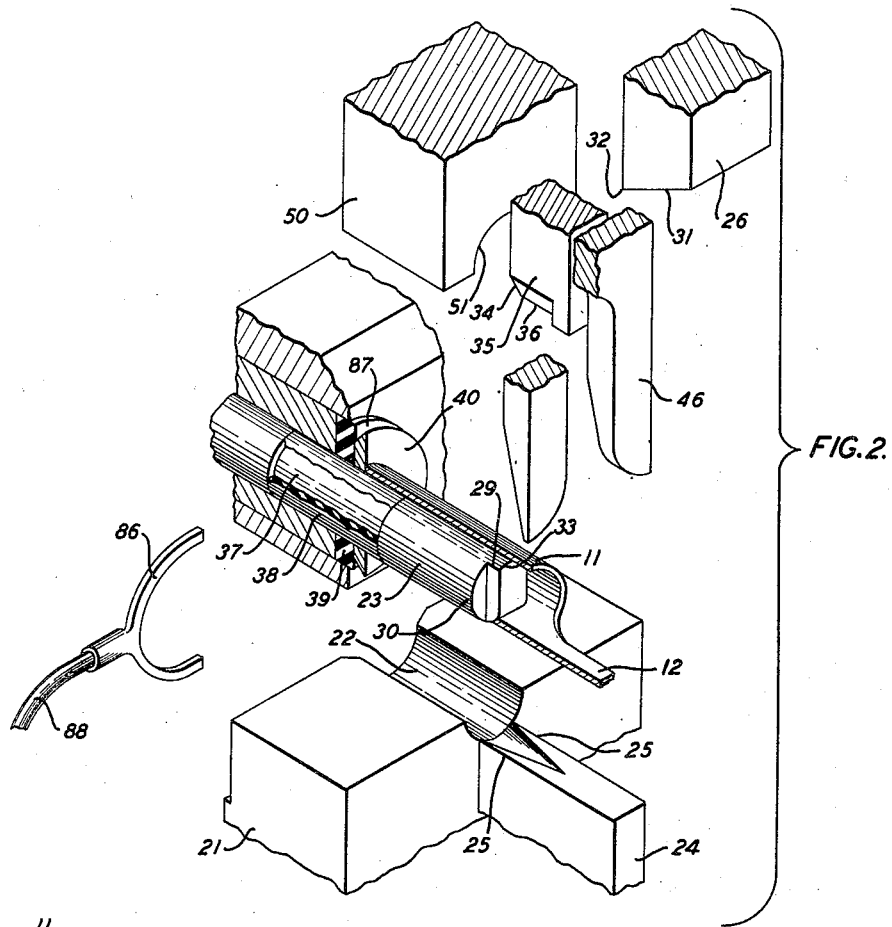
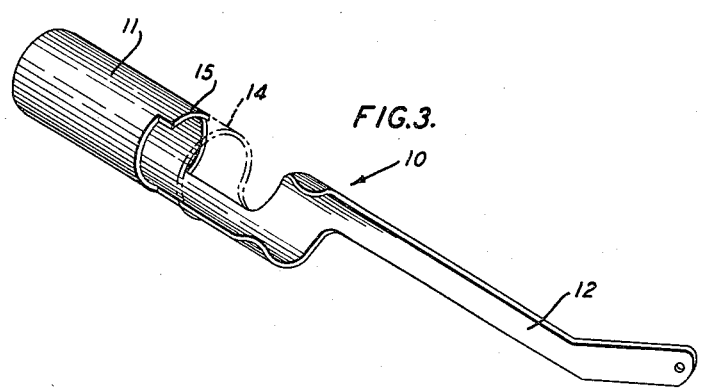
INVENTORS
H. W. DAVID
M. L. SVIKHART
BY
*W. C. Parnell*
ATTORNEY

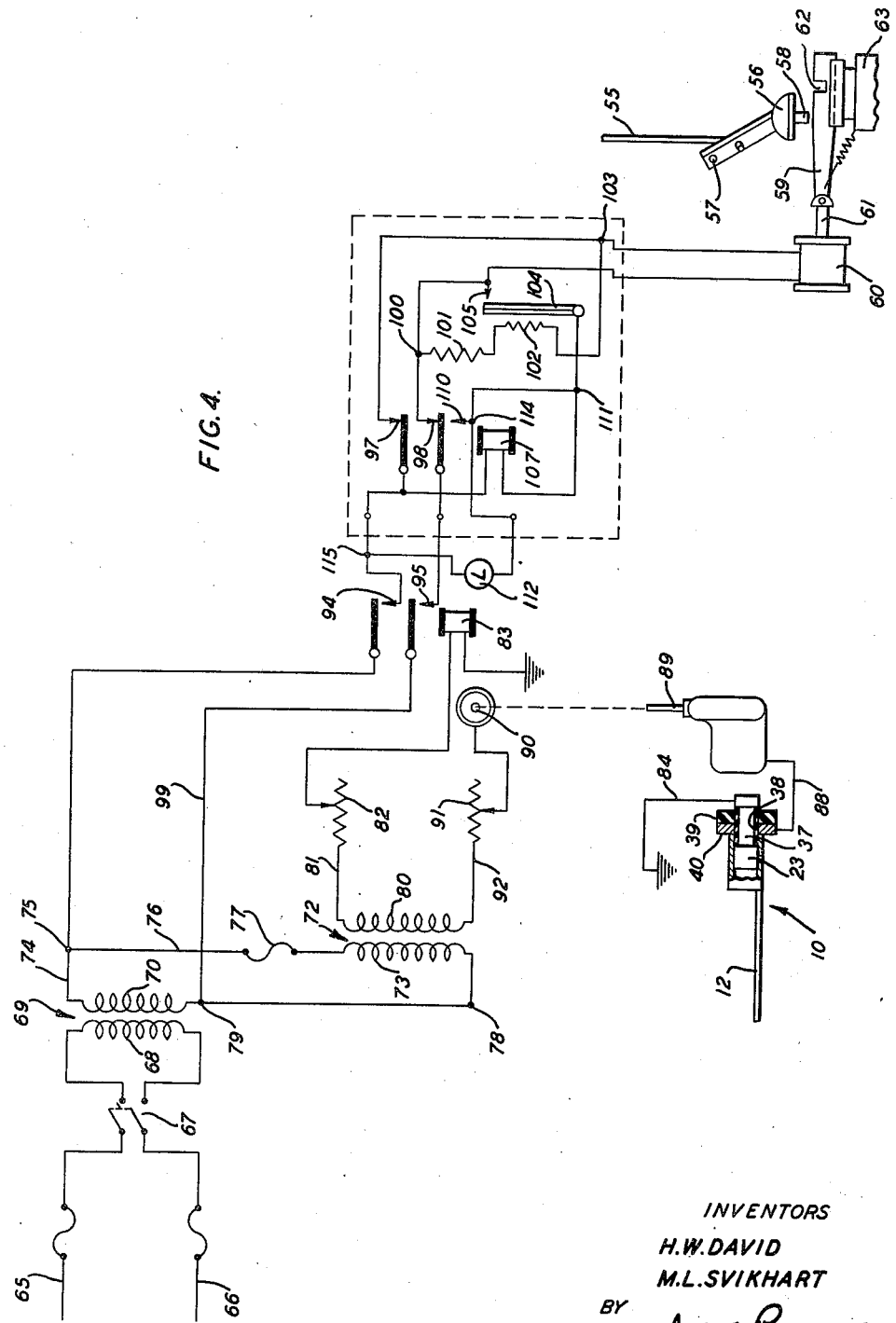

Patented July 31, 1951

2,562,702

UNITED STATES PATENT OFFICE 2,562,702

ARTICLE FORMING APPARATUS

Herman W. David, Montclair, and Miles L. Svikhart, Glen Ridge, N. J., assignors to Western Electric Company, Incorporated, New York, N. Y., a corporation of New York Application December 30, 1946, Serial No. 719,288

4 Claims. (Cl. 164—47)

This invention relates to article forming apparatus, and more particularly to the operating control means therefor.

In the manufacture of various metallic articles, such articles are frequently blanked and preformed in one machine and completed in another by shearing excess materials therefrom. The present articles before they are placed in the finishing apparatus include a terminal portion with a sleeve formed at one end thereof. The overall length of the article is to be maintained whereas the sleeve is to be reduced in length and given a final contour at the end of the sleeve intermediate the extreme ends of the article. In apparatus of the type employed for this final shearing operation, an arbor over which the sleeve is positioned projects from a stop for the article and serves in cooperation with shearing tools to shear the excess material from the sleeve and adjacent portion of the article. Although such apparatus are frequently equipped with nozzles to direct jets of air through the working area of the apparatus, subsequent to each shearing or forming operation, to blow the scrap parts from the working area, occasionally the metal chips remaining from the shearing operation become lodged upon the arbor in front of the stop preventing movement of subsequent articles to the proper position on the arbor in engagement with the stop. This results in the formation of defective articles by the removal of more material from the sleeve portion thereof than is desired and making the sleeve portion too short for its desired purpose.

The object of the invention is to provide an article forming apparatus including an operating means therefor which is under the control of the article, rendering the operating means effective only when the article is in the desired position for operation thereon.

With this and other objects in view the invention broadly comprises an article forming apparatus including a support for the article, a tool to form the article, and operating means for the movable tool under the control of an electrical circuit closed by the article when accurately positioned on the support.

More specifically, the article forming apparatus is to shear portions from an inner end of a contact sleeve which is to be of a given length after the shearing operation and to assure the given length of the sleeve, operating means for the apparatus depends upon the leading end of the article or sleeve engaging a gaging electrical contact. Furthermore, there is embodied in the apparatus a safety feature to prevent operation of the machine by shorting of the control circuit by metal chips resulting from the shearing operations.

Other objects and advantages will be apparent from the following detailed description when considered in conjunction with the accompanying drawings, wherein Fig. 1 is a side elevational view of the article forming apparatus, portions thereof being shown in section;

Fig. 2 is a fragmentary exploded perspective view of portions of the apparatus showing the article in position for operation;

Fig. 3 is an enlarged perspective view of the article to be formed by the apparatus; and Fig. 4 is a wiring diagram illustrating the control features of the apparatus.

Figure 1:
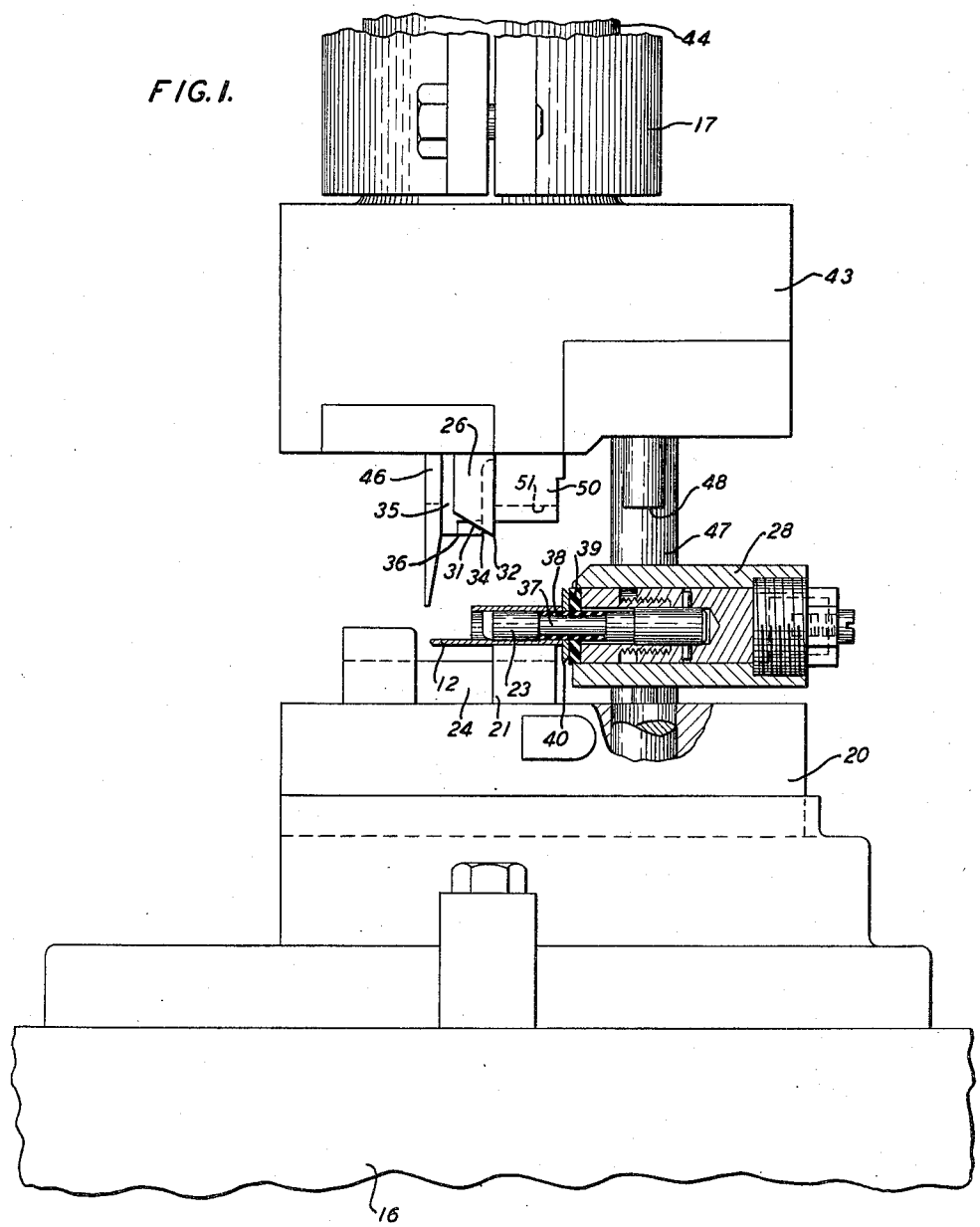

Referring now to the drawings, attention is first directed to Fig. 3 which illustrates the article to be formed by the apparatus. In the present embodiment the article is commercially known as a jack shell to be included as a part of a jack in telephone equipment. The article 10 shown in Fig. 3 is preformed with a shell or tubular end 11 and a terminal arm 12. In its preformed condition, the tubular end 11 includes the excess material, shown in dot-dash lines at 14, which is to be removed through a shearing operation in the apparatus. It will be noted that the final form of the article includes a lip 15 at a position diametrically opposed the integral connection of the terminal arm 12 with the shell.

The article forming apparatus shown in general in Fig. 1 is mounted on a stationary bed 16 of a commercial press having a ram 17 reciprocated through operating cycles under the control of a one revolution clutch (not shown) which is well known in the art of such presses and is not shown in detail for that reason.

The apparatus includes a base 20 upon which a cushion block 21 is mounted, the upper surface of the block being grooved at 22 to receive the tubular portion 11 of the article when placed upon its forming arbor 23. A shearing element 24 is mounted adjacent the block 21 and has shearing edges 25 cooperating with shearing elements 26 which will hereinafter be described. The arbor 23 is supported by a unit 28 and has its outer end formed as illustrated in Fig. 2 to provide shearing edges 29 and 30 upon each side thereof which will cooperate with shearing edges 31 and 32 respectively of the shearing elements 26. The arbor 23 also has a shearing edge 33 to coperate with a shearing edge 34 of a shearing element 35, positioned between the shearing elements 26, to cut the material 14 at the outer edge of the lip 15 of the article. The shearing edge 34 is V-shaped and has a companion shearing edge 36 to shear the scrap material 14 into two parts.

The central portion 37 of the arbor has been reduced circumferentially, the cylindrical cavity thus formed being filled with a sleeve 38 of insulating material. An annular insulating member 39 is positioned concentric with the arbor 23 adjacent the central portion of the sleeve 38 to electrically insulate an annular gaging contact 40 from the metal parts of the unit 28. The sleeve 38 also insulates the gaging contact 40 from the arbor, a given length of the sleeve 38 extending outwardly beyond the gaging contact.

A tool support 43 has a shank 44 by the aid of which the tool support is mounted in the ram 17 of the press. The shearing elements 26 are mounted in their respective positions upon each side of the centerline of the arbor 23 to accurately cooperate with the shearing edges 29 and 30 at each side of the outer end of the arbor. The shearing element 35 is also supported by the tool holder 43 between the elements 26 to cooperate with the shearing edge 34 of the arbor. A locating fork 46 carried by the tool support 43 straddles the terminal arm 12 of the article back of the tubular portion 11 to assure proper positioning of the article in the apparatus so far as the location of that portion of the terminal arm, integral with the tubular portion, at the lowermost portion of the groove 22 or the central position on the shearing element 24.

Certain features of the apparatus not essential to illustrate the invention have been left out of the drawings including a guard for the apparatus and air nozzles to direct jets of air to the working area of the apparatus. One of the usual guide rods or posts to assure accurate alignment of the relatively movable parts of the apparatus is shown at 47. The unit 28, for supporting the arbor, as well as the gaging contact 40, is held above the cushion block 21 when the apparatus is in its open position by a conventional type of spring actuated mechanism (not shown). A spring pressed rod 48 carried by the tool support 43 engages the unit 28 at the beginning of the operating cycle after the article has been located on the arbor to move the arbor unit downwardly with the article so that it will be supported by the cushion block 21 and the shearing element 24 prior to the shearing operations resulting from the continued movement of the shearing elements 26 and 35. Another pressure pad 50 carried by the tool holder 43 is under spring pressure and has a groove 51 in its lower surface to straddle the article on the arbor to cooperate with the groove 22 in the pad 21 to grip the article prior to and during the shearing operations.

Attention is now directed to Fig. 4 which shows the control circuits for the apparatus. As hereinbefore described, the press which is made a part of this apparatus has a ram 17 which may be connected to a power driven flywheel through a one revolution clutch (not shown). The clutch is released in the conventional manner by a pull rod 55 connected to a foot treadle 56 pivotally supported at 57. A lug or projection 58 mounted on the under surface of the treadle 56 is positioned above a latch 59 and is normally held unoperated so long as a solenoid 60 is deenergized. The latch 59 is connected to the core 61 of the solenoid to be moved thereby to position a notch 62 in alignment with the projection 58 when the solenoid is energized allowing downward movement of the treadle to pull the rod 55 sufficiently to release the clutch. A support 63 is provided for the latch 59.

At the lower central portion of this figure the arbor 23 is schematically illustrated with its insulating sleeve 38, the annular insulating member 39 and the gaging contact 40.

The control circuit begins with lead lines 65 and 66 of a 440 volt circuit from the main supply for driving the flywheel of the press and for carrying the apparatus through its operating cycles. A switch 67 connects the supply lines 65 and 66 to a primary winding 68 of a transformer 69 stepping the 440 volt current down to a 110 volt current at the secondary winding 70 of the transformer 69, this being the desired current for operating the solenoid 60. A further reduction in the current to a safe voltage is provided for the gaging contact 40 and the arbor 23 whereby a control circuit may be completed by the article 10 when disposed accurately in position to be formed by the apparatus. This additional transformation of a portion of the 110 volt current supply at the winding 70 of the transformer 69 is accomplished mainly through a transformer 72, the primary winding 73 of which is in a circuit from the secondary winding 70 through line 74, connection 75, line 76, fuse 77, the primary winding 73, connection 78 to the other side of the secondary winding 70, through connection 79. The transformer 72 reduces the 110 volt current to 16 volts. The secondary winding 80 is in a circuit which may be traced from line 81 through a variable resistance 82, a relay 83 to ground and from ground through line 84 to the arbor 23. The gaging contact 40 is connected by the aid of a clip 86 (Fig. 2), which lies in a groove 87 between the insulating member 39 and the gaging contact 40, through line 88, plug 89, socket 90, variable resistor 91 and line 92 to the other side of the secondary winding 80. The variable resistances 82 and 91 reduce the present current to 12 volts or less if desired. The relay 83 when energized operates contacts 94 and 95 to close a circuit through the solenoid 60 from the secondary winding 70 of the transformer 69. Unless the article 10 is positioned on the arbor 23 in engagement with the gaging contact 40 to complete the circuit through the relay 83, the relay 83 will not operate and its contacts 94 and 95 will remain open rendering the apparatus inoperable, by the latch 59 remaining in its normal position shown (Fig. 4). The circuit for the solenoid 60 may be traced from the secondary winding 70 through line 74, contact 94, closed contact 97, solenoid 60, closed contact 98, contact 95, line 99 and connection 79 to the other side of the winding 70.

A safety feature is embodied in the control circuit to render the apparatus inoperative should a metal chip, resulting from the shearing operation, become lodged about the arbor to interfere with the article moving to a position where it will engage the gaging contact 40. Any metal chip of this type interfering with the accurate location of the article, whether or not it originally causes a short in the circuit between the arbor 23 and the gaging contact 40 or is moved into this position when an article is positioned on the arbor for its forming operation, will cause the relay 83 to operate completing the circuit through the solenoid 60 through the closing of the contacts 94 and 95. When the solenoid circuit is closed, another circuit traced from connection 100, through resistance 101, a heating element or resistor 102, and connection 103 with the main lines of the solenoid circuit. The heater 102 is positioned adjacent a bi-metallic element 104 to heat the element and cause it to complete another circuit including a contact 105, providing the solenoid circuit 60 remains closed for a given length of time, namely twenty seconds, greater than that required for the operating cycle of the apparatus. The circuit completed by the bi-metallic element 104 and the contact 105 includes a relay 107 to open the contacts 97 and 98, when operated, to open the circuit to the solenoid 60. The circuit through the relay 107 may be traced from the secondary winding 70 of the transformer 69, through line 74, closed contact 94, relay 107, bi-metallic element 104, contact 105, closed contact 98, closed contact 95, line 99 and connection 79 to the other side of the winding 70. A locking circuit for the relay 107 is completed through a make contact 110 which may be traced from the winding 70, through line 74, closed contact 94, relay 107, connection 111, make contact 110, through closed contact 95, line 99, connection 79 to the other side of the secondary winding 70. This circuit remains closed holding the relay 107 operated until the cause for the short in the circuit has been removed, also holding the solenoid 60 unoperated as well as the clutch treadle 56 inoperable. A visual signal in the form of a lamp 112 is energized through a circuit included with the last mentioned circuit extending from one line thereof at connection 114 adjacent the make contact 110 and joined with the other line at connection 115.

Considering now the operation of the apparatus, it will be apparent that all that is required of the operator is to successively move articles of the type shown in Fig. 3 onto the arbor 23 until the apparatus operates, the operator being assured that the final length and contour of the tubular portion 11 is according to requirements. This assurance is the result of the fact that the apparatus will not operate unless the article is accurately positioned on the arbor 23 for the control circuit is closed only when the article touches the gaging contact 110, completing the circuit to energize the relay 83 which in turn closes its contacts 94 and 95 to energize the solenoid 60. When the solenoid 60 operates, the latch 59 is moved to the left to align the notch 62 therein with the projection 58 of the treadle 56 conditioning the operating means for the apparatus for operation. Until the solenoid 60 is operated, pressure on the treadle 56 will not release the clutch for an operating cycle of the apparatus as the projection 58 engaging the top of the latch 59 will prevent the necessary downward movement of the clutch release rod 55 to operate the clutch.

When the clutch is operated, the tool support 43 will move downwardly to first move the unit 28 with the arbor 23 and article downwardly until they are nested in the groove 22 of the pad 21, the adjacent portions of the article resting on the element 24. Continued movement of the tool holder 43 will cause the forked member 47 to straddle the portion of the article adjacent the shell or tubular portion 11 to make a final adjustment of the article on the arbor 23 before the tools or shearing elements 26 and 35 meet the article and begin their shearing operations in cooperation with the shearing edges 29—30 and 33 of the arbor 23. Further downward movement of the tool holder 43 to complete one-half of the operating cycle will shear the excess material 14 from the article leaving the article as illustrated in solid lines in Fig. 3 with the tubular portion 11 of a given length and with the lip 15 formed thereon.

The operating cycle may be repeated as rapidly as it is possible for the operator to insert the blank of an article on the arbor against the gaging contact, press the treadle 56 downwardly to start the operating cycle and remove the completed article during the upstroke of the apparatus or the tool support 43 thereof.

Should the apparatus fail to operate, that is, should the solenoid 60 fail to move the latch 59 whereby the treadle 56 may be actuated to release the clutch, the operator is assured, particularly, when checking the lamp or signal 112 which, when illuminated, will indicate that the main circuit through the relay 83 is shorted by a scrap of metal closing the circuit between the arbor 23 and the gaging contact 40. When this occurs, the main circuit through the relay 83 will be held closed a greater length of time than that necessary for each operating cycle of the machine allowing the resistor or heating element 102 a sufficient length of time to heat the bi-metallic element 104 to cause it to close its contact 105, energizing the relay 107 to open the circuit to the solenoid 60 and illuminate the lamp 112. The apparatus therefore cannot be operated until this trouble has been removed, namely, the removal of the metal scrap shorting the main circuit. The importance of this feature is to maintain the arbor 23 and the gaging contact 40 free of any foreign particles which would interfere with the articles 10 from being moved into their desired positions in engagement with the gaging contact resulting in operation of the apparatus to form shorter tubular portions 11 than that required.

Although specific improvements of the invention have been shown and described, it will be understood that they are but illustrative and that various modifications may be made therein without departing from the scope and spirit of this invention as defined by the appended claims.

What is claimed is:

1. An article forming apparatus comprising a support for an article when moved into a forming position, a tool to form the article movable through single operating cycles relative to the support, means operable to cause movement of the tool through an operating cycle, an electrically energizable unit normally holding the said means unoperated, an electrical circuit for the unit, means under the control of the article to close the circuit when the article is in the forming position to energize the unit to render the said tool moving means operable, and means operated when the said electrical circuit is held closed for a given length of time greater than that required for one cycle of operation of the tool moving means to open the said circuit, to deenergize the unit and render the tool moving means inoperable.

2. An article forming apparatus comprising a support for an article when moved into a forming position, a tool to form the article movable through single operating cycles relative to the support, means operable to cause movement of the tool through an operating cycle, an electrically energizable unit normally holding the said means unoperated, a gaging contact electrically insulated from the support and positioned to be engaged by the article when moved into the forming position on the support, an electric circuit including the support and gaging contact to be closed through the article when moved on the support into engagement with the gaging contact to cause energization of the unit to render the said tool moving means operable, and means operated, when an object of conductive material closes the electric circuit between the support and the gaging contact for a given length of time greater than that required for one operating cycle of the tool moving means, to cause deenergization of the unit to render the tool moving means inoperable.

3. An article forming apparatus comprising a support for an article when moved into a forming position, a tool to form the article movable through single operating cycles relative to the support, means operable to cause movement of the tool through an operating cycle, an electrically energizable unit normally holding the said means unoperated, a gaging contact electrically insulated from the support and positioned to be engaged by the article when moved into the forming position on the support, an electric circuit including the support and gaging contact to be closed through the article when moved on the support into engagement with the gaging contact to cause energization of the unit to render the said tool moving means operable, means operated, when an object of conductive material closes the electric circuit between the support and the gaging contact for a given length of time greater than that required for one operating cycle of the tool moving means, to cause deenergization of the unit to render the tool moving means inoperable, and a signal operated when the unit is deenergized.

4. An apparatus for forming substantially cylindrical metal articles comprising an electrically conductive forming arbor receivable in the metal articles singly, a tool movable through single operating cycles relative to the forming arbor and cooperating therewith to form a given portion of the metal article when the article is disposed in a forming position on the forming arbor, means operable to cause movement of the tool through an operating cycle, an electrically energizable unit normally holding the said means unoperated, an electrical circuit for the unit including the forming arbor, and an electrical gaging contact mounted at a given position relative to the forming arbor and insulated therefrom whereby the metal article when moved into the forming position to engage both the forming arbor and the contact will become a part of the circuit to close the circuit to energize the unit to render the tool moving means operable.

HERMAN W. DAVID.
MILES L. SVIKHART.

REFERENCES CITED

The following references are of record in the file of this patent:

UNITED STATES PATENTS

| Number | Name | Date |
| --- | --- | --- |
| 376,541 | Mergentholer | Jan. 17, 1888 |
| 918,813 | Armstrong | Apr. 20, 1909 |
| 947,744 | Stohr | Jan. 25, 1910 |
| 1,385,369 | Ferrier | July 26, 1921 |
| 1,745,873 | Stolz | Feb. 4, 1930 |
| 1,958,138 | Fowler et al. | May 8, 1934 |